Aug. 15, 1950 H. L. WHITLEY 2,519,304
APPARATUS FOR CRUSHING STEMS OF VEGETATION
Filed May 29, 1947 4 Sheets-Sheet 1
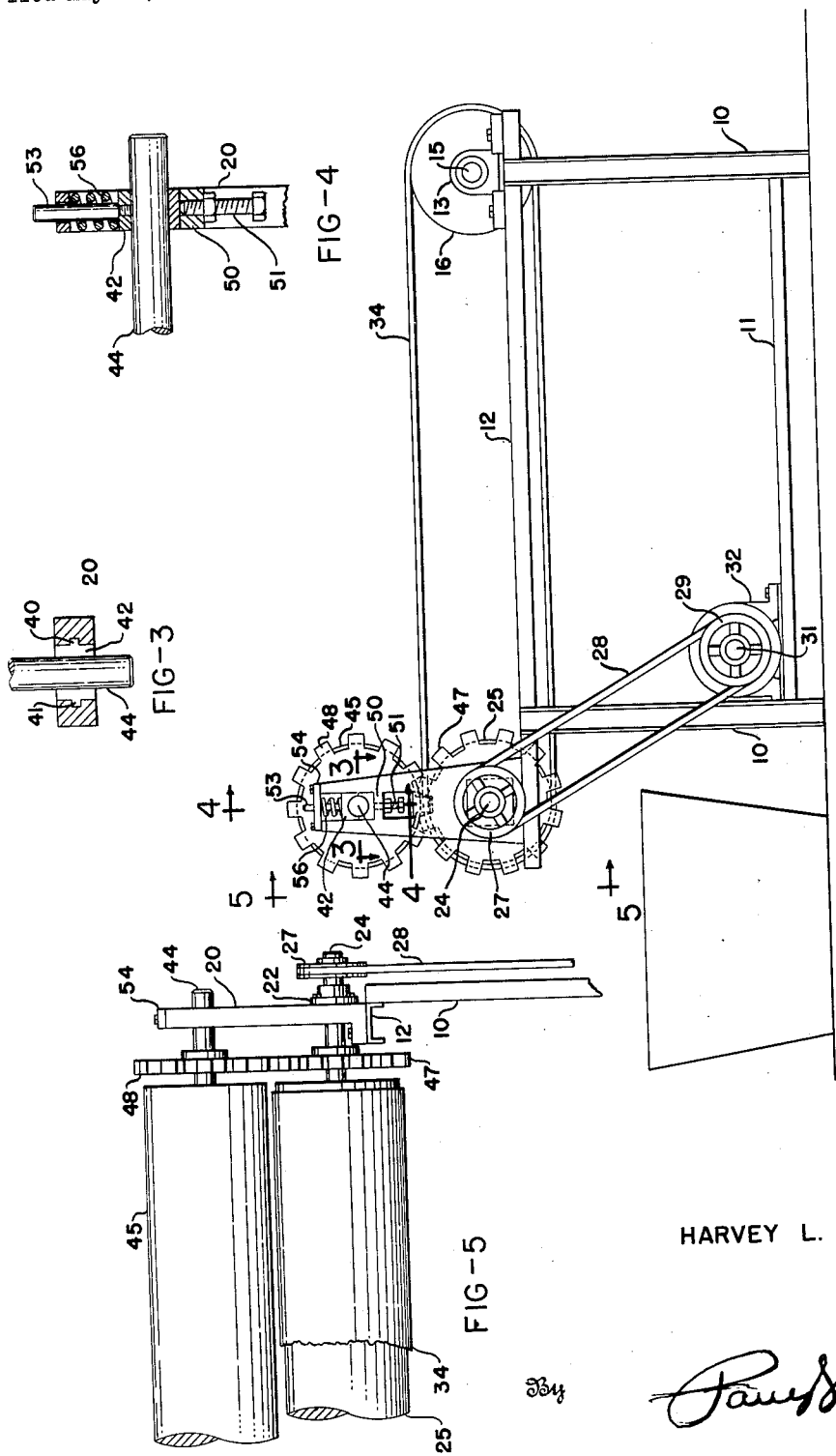
HARVEY L. WHITLEY
Inventor
By Paul S. Eaton
Attorney

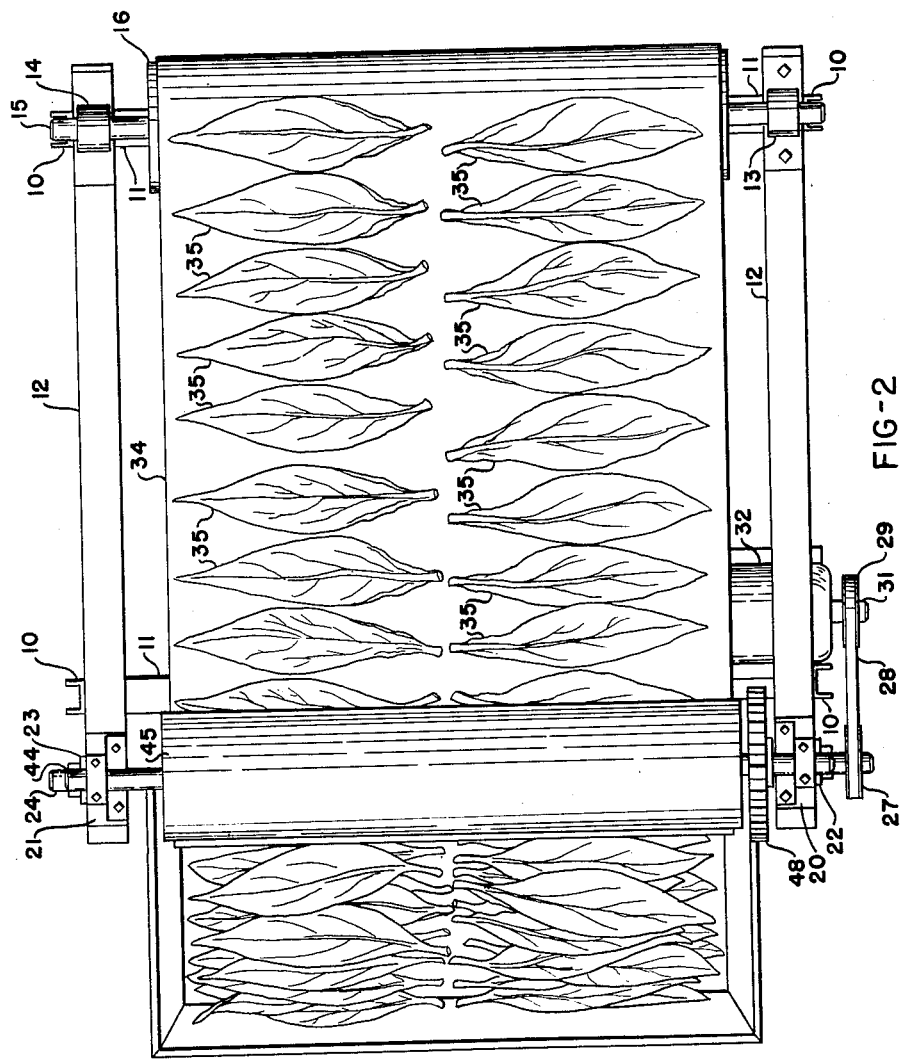

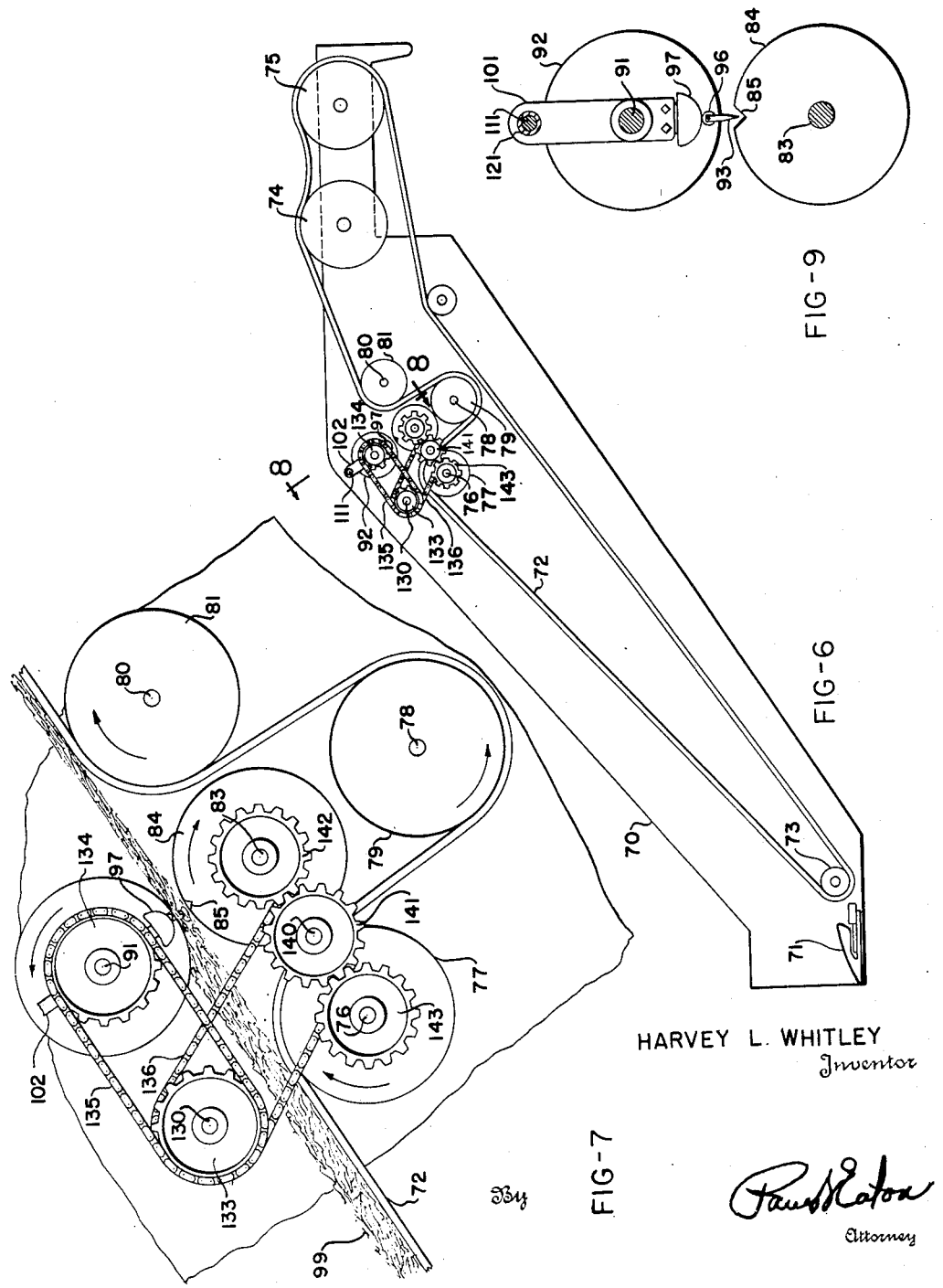

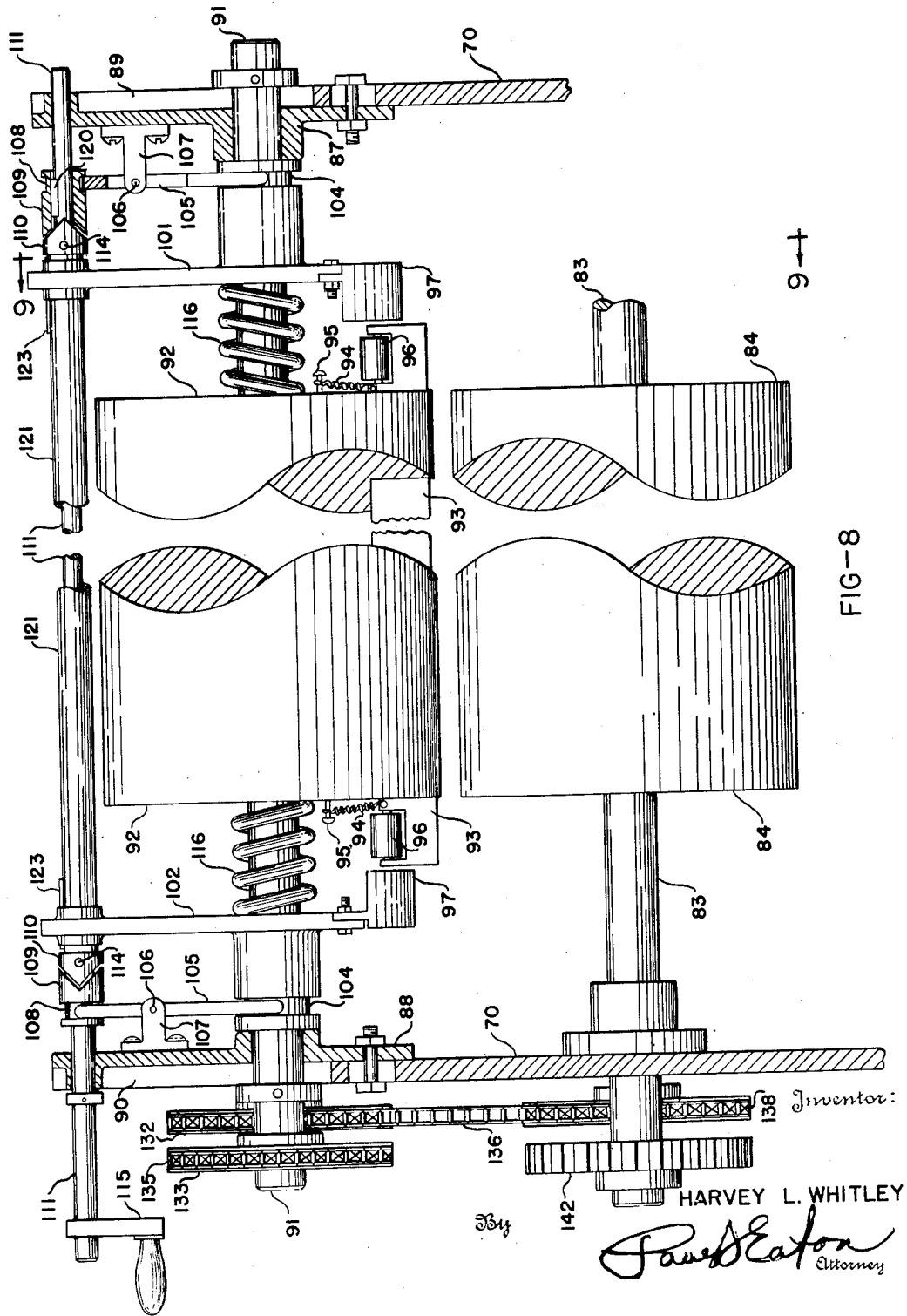

Patented Aug. 15, 1950

2,519,304

UNITED STATES PATENT OFFICE 2,519,304

APPARATUS FOR CRUSHING STEMS OF VEGETATION

Harvey L. Whitley, Fremont, N. C.

Application May 29, 1947, Serial No. 751,269

1 Claim. (Cl. 146—119)

This invention relates to a method and means for crushing vegetation such as the stems of tobacco leaves and other vegetation, such as hay, which is cut and baled by apparatus such as shown in my co-pending application entitled a Hay Harvester Apparatus, Ser. No. 716,400, filed December 14, 1946.

It is an object of this invention to provide conveying means for conveying vegetation, said conveying means passing between two spring pressed rollers which crush the stems of the vegetation so as to cause it to dry much more readily than if the stems were not crushed.

It is another object of this invention to provide apparatus for crushing the stems of tobacco leaves comprising a conveyor for conveying the leaves and a spring pressed roller adapted to press the leaves against the conveyor to crush the stems thereof, but being so spaced from the conveyor that sufficient pressure will not be allowed to be exerted to cause the leafy portion of the tobacco to be crushed, but only the stems which are much thicker than the leafy portion will be crushed.

Some of the objects of the invention having been stated, other objects will appear as the description proceeds when taken in connection with the accompanying drawings, in which Figure 1 is a side elevation of an apparatus for carrying out the method of crushing the tobacco stems or for crushing the stems of any type of vegetation;

Figure 2 is a top plan view of the apparatus shown in Figure 1;

Figure 3 is a sectional plan view taken along the line 3—3 in Figure 1;

Figure 4 is a vertical sectional view taken along the line 4—4 in Figure 1;

Figure 5 is an end elevation taken along the line 5—5 in Figure 1;

Figure 6 is an elevation of one side of the conveyor mechanism shown in said co-pending patent application and showing a stem crushing attachment associated therewith;

Fig. 7 is an enlarged elevation of the upper central portion of Figure 6;

Figure 8 is a view partly in elevation and partly in section and taken substantially along the line 8—8 in Figure 6;

Figure 9 is a vertical sectional view taken along the line 9—9 in Figure 8 showing the blade in lowered or cutting position.

Referring more specifically to the drawings, the numeral 10 indicates a plurality of upright posts secured together by one or more struts 11. The top portion of this frame has an angular frame 12 secured thereto, and near one end of the angular frame 12 are bearing blocks 13 and 14 in which a shaft 15 is rotatably mounted, and which shaft has fixedly mounted thereon a roller 16.

Near the other end of the angular frame 10, suitable upright brackets 20 and 21 are provided in which are mounted bearing blocks 22 and 23 for rotatably mounting a shaft 24 which has integral therewith a roller 25. The shaft 24 has mounted thereon a pulley 27 provided with a belt 28 which is also mounted on a pulley 29 secured on motor shaft 31 of an electric motor 32 supported on one or more of the struts 11. This imparts rotary movement to the roller 25. The rollers 25 and 16 have mounted thereon an endless conveyor 34 onto which tobacco leaves 35 may be deposited so that the stems may be crushed.

The vertical brackets 20 and 21 have vertically disposed slots therein which are grooved on their proximate edges and into which tongues 40 and 41 of bearing blocks 32 project to permit vertical sliding movement of the bearing blocks 42. The bearing blocks 42 have rotatably mounted therein a shaft 44 having integral therewith a roller 45. The roller 25 has a gear 47 secured to one end thereof and the roller 45 has a gear 48 secured to the end thereof immediately above the gear 47. These mesh with each other and therefore rotative movement imparted to roller 25 will impart rotation to the roller 45.

Each of the brackets 20 and 21, as before described, having the bearing blocks 42 mounted for vertical sliding movement therein, has a transverse bridge portion 50 penetrated by a set screw 51 which is adapted to engage the lower surface of the bearing blocks 42. The bearing blocks 42 have projecting upwardly therefrom a pin 53 which slidably penetrates cap plates 54 mounted on the upper end of the brackets 20 and 21. Disposed between the bearing blocks 42 and the cap plates 54 is a compression spring 56 which presses the top roller 45 downwardly towards the endless conveyor belt 34. However, the bridge 50 is disposed at such an elevation in the two brackets 20 and 21 as to prevent downward movement of the upper roller 45 below a predetermined point to therefore always cause its periphery not to touch the conveyor belt 34.

The above-described mechanism is suitable for the crushing of tobacco stems before they are strung onto tobacco sticks for a curing operation, because by crushing the thick portions of the stems as well as some of the feeder stems, it has been found that by the time the leaf has been cured in a tobacco barn that the crushed stems will likewise be cured as quickly and thus it will prevent running the temperature very high in the barns in order to kill out the stems because they will be dried practically as quickly as the leafy portions of the leaves themselves, and thus, not only a great saving of time and expense will be incurred in the curing of tobacco, but also it will prevent fire hazards and other inconveniences and possible damage to the tobacco by running the high temperatures in the barns for curing the stems of the tobacco.

This method and apparatus for crushing stems of tobacco can equally be applied to crushing stalks and stems of hay and other vegetation which is cut and baled as disclosed in my said co-pending patent application. In the co-pending application, a conveyor is shown having side pieces, one of which is indicated in the present drawings as at 70, and this conveyor mechanism has a cutter bar indicated at 71, and an endless belt 72 mounted on an idler roller 73 and also passing over rollers 74 and 75 where a roller indicated at 245 in said co-pending application winds the hay therearound, and when a roll of hay has been completed, the reel shown in said co-pending application is moved to place a new roll in position for the winding of another bale of hay. In said co-pending application, no means are provided for cutting the sheet of vegetation to cause a clean break at the end of one bale of hay and in the present modified form, means are provided not only for crushing the stems of the hay before it is baled, but also for cutting the web of hay when a bale is about completed.

In the present embodiment of the invention, it is evident that in order to cut the web of hay there must be a space where the knife for cutting the hay will not engage the endless conveyor belt 72. Therefore, I have mounted in the side walls 70 this additional mechanism for crushing the web of hay and also for cutting the web when a bale is about completed. This modified form is indicated in Figures 6 to 9, inclusive, in this application.

In the side walls 70 I mount a shaft 76 having fixed thereon a roller 77 and there is also mounted in these side walls 70, for rotation, a shaft 78 having an idler roller 79 thereon. I also mount a shaft 80 in these side walls having an idler roller 81 thereon and the belt 72 is passed over these rollers so as to form a gap in its continuity for providing a crushing and cutting means. In the side walls 70 I also mount for rotation a shaft 83 having a roller 84 fixed thereon. This roller has a longitudinally extending groove 85 extending therealong for purposes to be presently described.

Immediately above the roller 83 is adjustably secured bearing blocks 87 and 88 to the side walls 70, and these side walls have slots 89 and 90 therein through which a shaft 91 projects after passing through the bearing portions 87 and 88. This shaft 91 has fixed thereon a pressure roller 92 and extending longitudinally of the roller 92 is a comparatively deep slot in which is slidably mounted a knife blade 93. This knife blade 93 is held completely telescoped in the slot by means of compression springs 94 secured near the end thereof and having their other ends secured to spring perches 95 on the end of the roller. The ends of the knife 95 have mounted therein rollers 96 which are adapted to be engaged by cam faces 97 for moving the knife 93 out of its slot and to penetrate a web of hay or other material indicated at 99 and to penetrate slot 85 in roller 83 to sever the web when a bale is about completed.

Sidably mounted on the shaft 91 is a pair of brackets 101 and 102 having the cam members 97 secured to their lower ends. These brackets 101 and 102 have peripheral grooves 104 therein which are loosely penetrated by a lower end of a forked member 105 pivoted as at 106 to a bracket 107 secured to the inner surfaces of the side pieces 87 and 88. The upper ends of the members 105 are also forked and loosely fit into a peripheral groove 108 in sliding cams 109 which have cam faces on their proximate ends which are adapted to engage cam members 110 fixedly mounted on a tube 121 fixed in the upper portions of brackets 101 and 102 by means of keys 123.

The cam members 110 are fixed on the tube 121 by any suitable means such as by means of pins 114. The cam members 109 are slidably mounted on the shaft 111. The shaft 111 has a crank 115 mounted thereon whereby rotation can be imparted to the shaft 111.

The members 101 and 102 are normally pressed away from the ends of the roller 92 by means of compression springs 116 disposed between the ends of the roller 92 and the members 101 and 102. The upper ends of the members 101 and 102 are slidably mounted on the tube 121. The bearing portions on the upper ends of members 101 and 102 are slidably mounted on the tube 121. The bearing portions on the upper ends of members 101 and 102 are keyed as at 123 on the tube 121 for longitudinal sliding movement thereon. The cams 109 being keyed to shaft 111 will therefore cause the cams 109 to rotate with the shaft 111, and when the shaft 111 is given a quarter turn it will force the cams 109 away from each other because they are riding on the cams 110, and thus the upper ends of members 105 will be moved away from each other which will move the cam members 97 on their lower ends inwardly into engagement with the rollers 96 to move the knife 93 outwardly beyond the periphery of roller 92, and will cause it to enter the slot 85 in roller 83, as they are timed to rotate together, and thus sever the web 99 of hay passing between the rollers 83 and 92.

Passing between the two side portions 70 is a shaft 130, and on one end of this shaft is mounted two sprocket wheels 132 and 133. Mounted on shaft 91 is a sprocket wheel 134, and a sprocket chain 135 is mounted on sprockets 134 and 133. A sprocket chain 136 is mounted on sprocket wheel 132, and this sprocket chain 136 is also mounted on a sprocket wheel 138 mounted on a stub shaft 140. The sprocket 138 has integral therewith an idler gear 141. The idler gear 141 meshes with gears 142 and 143 fixed on shafts 83 and 76 respectively.

In the drawings and specification there has been set forth a preferred embodiment of the invention, and although specific terms are employed, they are used in a generic and descriptive sense only, and not for purposes of limitation, the scope of the invention being defined in the claim.

I claim:

Apparatus for crushing a traveling web of loose vegetation and intermittently severing the web, comprising an upper driven roller and a lower driven roller whose peripheries are adjacent each other and between which the web of material is fed, one of the rollers having a longitudinally and radially disposed groove therein, a knife mounted for radial sliding movement in said groove and having its ends extending from the ends of said groove, spring means normally holding the knife completely telescoped in said groove, the roller in which the knife is mounted having bearing shafts extending from each end thereof, a pair of brackets slidably mounted on said bearing shafts and each having a cam surface on its lower end, spring means normally holding said brackets in a position to cause their cam surfaces to be out of the path of the ends of the knife, and rotatable cam means for engaging the upper ends of said brackets for moving the brackets simultaneously towards each other to move their cam surfaces into the path of the ends of the knife to move it radially of its roller as the knife reaches a point adjacent the other roller to sever the web passing between the two rollers.

HARVEY L. WHITLEY.

REFERENCES CITED

The following references are of record in the file of this patent:

UNITED STATES PATENTS

| Number | Name | Date |
|---|---|---|
| 4,371 | Blackman | Feb. 10, 1846 |
| 200,246 | Borgfeldt | Feb. 12, 1878 |
| 333,867 | Lauhoff | Jan. 5, 1886 |
| 482,413 | Raatz | Sept. 13, 1892 |
| 944,172 | Bond | Dec. 21, 1909 |
| 1,279,542 | Hendricks | Sept. 24, 1918 |
| 1,459,041 | Widmer | June 19, 1923 |
| 1,986,212 | Mahon | Jan. 1, 1935 |
| 2,101,439 | Lindgren | Dec. 7, 1937 |
| 2,445,174 | Hannewald | July 13, 1948 |